United States Patent
Asayama et al.

[11] Patent Number: 5,238,885
[45] Date of Patent: Aug. 24, 1993

[54] SIALON TYPE SINTERED BODIES AND METHOD OF PRODUCING THE SAME

[75] Inventors: Masahiro Asayama; Michiyasu Komatsu; Tsuneji Kameda; Akio Sayano, all of Kanagawa, Japan

[73] Assignee: Kabushiki Kaisha Toshiba, Kawasaki, Japan

[21] Appl. No.: 764,302

[22] Filed: Sep. 24, 1991

[30] Foreign Application Priority Data

Sep. 25, 1990 [JP] Japan .................. 2-254656
Jun. 10, 1991 [JP] Japan .................. 3-137549

[51] Int. Cl.$^5$ ........................... C04B 35/58
[52] U.S. Cl. ........................... 501/98; 501/92; 501/95
[58] Field of Search ............ 501/92, 97, 98, 95

[56] References Cited

U.S. PATENT DOCUMENTS

| | | | |
|---|---|---|---|
| 4,218,253 | 8/1980 | Dworak et al. | 501/92 X |
| 4,767,727 | 8/1988 | Claussen et al. | 501/92 X |
| 4,801,564 | 1/1989 | Baba | 501/92 |
| 4,816,428 | 3/1989 | Kishi et al. | 501/89 |
| 4,826,791 | 5/1989 | Mehrotra et al. | 501/92 X |
| 4,946,807 | 8/1990 | Okuno et al. | 501/92 X |
| 5,059,565 | 10/1991 | Peuckert et al. | 501/97 |

FOREIGN PATENT DOCUMENTS

00397525A1 11/1990 European Pat. Off.
61-186268 8/1986 Japan.
1329510 3/1991 Japan.

OTHER PUBLICATIONS

Chemical Abstracts, vol. 102, No. 22, Jun. 3, 1985, Abstract No. 189759, "Abrasion-resistant Sialon-based ceramics".

Primary Examiner—Karl Group
Attorney, Agent, or Firm—Foley & Lardner

[57] ABSTRACT

Sintered bodies with the primary phase of $\beta$ and/or $\alpha$ prime sialon. In the sialon phase which is the primary phase, hafnium oxide and silicon carbide are dispersedly contained as dispersion phases. 1 to 60 parts by weight of hafnium oxide are contained in 100 parts by weight of the primary phase. 5 to 30 parts by weight of silicon carbide are contained in 100 parts by weight of the primary phase. Hafnium oxide suppresses decrease of sintering characteristic which is caused by silicon carbide. Thus, a large amount of silicon carbide can be added, thereby improving the fracture toughness value.

17 Claims, 1 Drawing Sheet

0.5 μm

SIALON TYPE SINTERED BODIES AND METHOD OF PRODUCING THE SAME

BACKGROUND OF THE INVENTION

1. Field of the Invention

The present invention relates to ceramic sintered bodies of which main component is a sialon with high fracture toughness value and relates to the method of producing the same.

2. Description of the Related Art

Sialon type sintered bodies of which main component is Si-Al-O-N have excellent characteristics of such as small coefficient of thermal expansion, high heat resistance, high acid resistance, and high erosion resistance. The sialon type sintered bodies have been used as structural materials like $Si_3N_4$ group sintered bodies, SiC group sintered bodies, and so forth.

The sialon type sintered bodies have excellent characteristics of such as small degradation of strength in high temperature range and high acid resistance in comparison with the $Si_3N_4$ group sintered bodies. On the other hand, the sialon type sintered bodies have a disadvantage of lower reliability as a structural material than the $Si_3N_4$ group sintered bodies. To improve the reliability of the sialon type sintered bodies, particles which are not solid solved in a sialon type sintered body, for example, particles of SiC, have been dispersed therein. An object of this attempt was to improve the fracture toughness value by a complex effect along with dispersed particles.

The sialon type sintered bodies in which different particles of such as SiC are dispersed and contained can be produced by adding different particles of such as SiC to powder satisfying a sialon composition (hereinafter named sialon powder). However, when the different particles of such as SiC are added to sialon powder, the sintering characteristic of the sialon powder is remarkably degraded. Thus, so far, when a pressure-free sintering method such as normal pressure sintering method was used, at most around 5 parts by weight of SiC or the like as dispersed particles could be added to 100 parts by weight of sialon powder. If more parts of SiC or the like were added, sintered bodies could not be constructed with high density by the pressure-free sintering method. Thus, so far, the effect of improving the fracture toughness value due to dispersed particles could not be satisfactorily accomplished by the conventional method.

On the other hand, by using a hot press method, it is possible to add around 50 parts by weight of SiC particles or the like to 100 parts by weight of sialon powder. However, the hot press method has the following disadvantages. In other words, when the hot press method is used, the shapes of products are limited to simple ones. In addition, the hot press method is not suitable for mass production due to a high production cost. Moreover, even if the hot press method is used, the fracture toughness value which can be obtained is not satisfactory. Furthermore, even if HIP method or the like is used, a remarkable effect cannot be achieved.

In comparison with the hot press method, the pressure-free sintering method has advantages of high degree of freedom with respect to shapes of sintered bodies, a low production cost, and suitability of mass production. Thus, it was strongly desired to provide sialon type sintered bodies with high fracture toughness value by using the pressure-free sintering method.

SUMMARY OF THE INVENTION

Therefore, an object of the present invention is to provide sialon type sintered bodies having high density and high fracture toughness value, the sintered bodies being able to be produced by pressure-free sintering process suitable for mass production,. In addition, a further object of the present invention is to provide a method of producing sialon type sintered bodies with high density and high fracture toughness value by pressure-free sintering method suitable for mass production.

A sialon sintered body according to the present invention comprises a primary phase substantially satisfying $\beta$ and/or $\alpha$ prime sialon composition, and a dispersion phase dispersedly contained in the primary phase, the dispersion phase having 1 to 60 parts by weight of hafnium oxide and 5 to 30 parts by weight of silicon carbide for 100 parts by weight of the primary phase.

In addition, a sialon type sintered body according to the present invention is characterized in that a mixture of 1 to 60 parts by weight of hafnium oxide, 5 to 30 parts by weight of silicon carbide, and 100 parts by weight of silicon nitride containing 2.5% to 20% by weight of aluminum oxide is molded and sintered.

Moreover, a method of producing sialon type sintered bodies according to the present invention comprises the steps of mixing 1 to 60 parts by weight of hafnium oxide powder and 5 to 30 parts by weight of silicon carbide powder with 100 parts by weight of silicon nitride powder containing 2.5 to 20 by weight of aluminum oxide powder, molding the mixture powder into a desired shape, and sintering the resultant molded body in a pressure-free atmosphere.

The primary phase of the sintered bodies according to the present invention substantially satisfies the sialon composition. In other words, when 90% or more by volume of the primary phase are the sialon, the effects of the present invention can be obtained. The primary phase may contain a secondary phase of around several % by weight of glass phase or the like besides the sialon phase. Thus, the starting material for obtaining the primary phase may not always and strictly satisfy the sialon composition. However, with respect to the characteristics of the sialon, the starting material may not preferably contain the glass phase or the like.

The sialons can be categorized as $\beta$ prime sialon composition and $\alpha$ prime sialon composition. The primary phase of the ceramic sintered bodies according to the present invention is the $\beta$ prime sialon which can be substantially represented with $Si_{6-z} Al_z O_z N_{8-z}$ (where $0 < z \leqq 4.2$). However, the primary phase of the ceramic sintered bodies according to the present invention may be the $\alpha$ prime sialon.

The sialon type sintered bodies according to the present invention are particle dispersed type where the above mentioned primary phase contains hafnium oxide and silicon carbide which are dispersed therein. Hafnium oxide and silicon carbide are not solid soluble in crystalline particles of the sialon. Thus, hafnium oxide and silicon carbide are present independently in the structure of sintered bodies and construct a dispersion phase.

Hafnium oxide functions as a sintering assistant agent for the sialon type sintered bodies containing silicon carbide. In other words, in the sintering process, hafnium oxide becomes a liquid phase and promotes sintering in the liquid phase and thereby contributing to high density of the sintered bodies. After the sintering process, hafnium oxide is present independently in the structure of the sintered body as a dispersion phase. When a standard sintering assistant agent such as yttrium oxide is used, it is present in the sintered body as a glass phase or the like. The glass phase degrades the strength at high temperature of the sialon type sintered bodies. High strength at high temperature is one of characteristics of the sialon type sintered bodies. On the other hand, hafnium oxide does not degrade the high temperature characteristic. In addition, hafnium oxide contributes to improving the mechanical strength of sintered bodies and so forth as dispersed particles. The particles of hafnium oxide are present at the triple point of the sialon crystalline particles and at the interface between the sialon crystalline particles and the silicon carbide particles.

Even for the composition where silicon carbide is added, hafnium oxide readily contributes to high density sintering thereof. Thus, a large amount of silicon carbide can be added to the sialon type sintered bodies. In addition, the sintering assistant agent does not degrade the high temperature characteristic. An adding amount of hafnium oxide has to be in the range from 1 to 60 parts by weight to 100 parts by weight of the above mentioned primary phase. When the adding amount of hafnium oxide is less than 1 part by weight, the sialon sintered bodies cannot have satisfactory high density. In contrast, when the adding amount of hafnium oxide exceeds 60 parts by weight, it degrades the sintering characteristic and increases specific gravity. The adding amount of hafnium oxide is preferably in the range from 5 to 50 parts by weight. The adding amount of hafnium oxide is more preferably in the range from 10 to 30 parts by weight. The adding amount of hafnium oxide is preferably determined in accordance with the adding amount of silicon carbide because of the reasons described later.

Silicon carbide is present independently in a particle state in the structure of the sialon type sintered bodies. Thus, silicon carbide constructs a dispersion phase in the sialon type sintered bodies. The dispersion phase causes the fracture toughness value and mechanical strength to be improved. In other words, in the cooling process after the sintering process, a residual stress field is formed at the periphery of the silicon carbide particles. This residual stress field prevents further cracking. Thus, the fracture toughness value of the sialon type sintered bodies is improved. The mechanical strength is also improved. Silicon carbide which is present in the primary phase may be either in normal particle state or in whisker state. When silicon carbide is in the particle state, the average particle diameter is preferably 50 $\mu$m or less. On the other hand, when silicon carbide is in the whisker state, the shorter diameter and the aspect ratio thereof are preferably in the range from 0.2 $\mu$m to 30 $\mu$m and in the range from 1:30 to 1:20, respectively.

Thus, when hafnium oxide is added, it is possible to add a large amount of silicon carbide to the primary phase, namely, add 5 to 30 parts by weight of silicon carbide to 100 parts by weight of the primary phase. The fracture toughness of the sialon type sintered bodies can be remarkably improved when an addition amount of nitrogen oxide exceeds around 5 parts by weight to 100 parts by weight of the primary phase. However, when the adding amount of silicon carbide exceeds 30 parts by weight, even if hafnium oxide is also added, it becomes difficult to obtain the sintered bodies with satisfactory high density.

When a large amount of hafnium oxide is added in accordance with adding a large amount of silicon carbide, the particles of hafnium oxide grow and thereby occasionally forming a large particle aggregate with a diameter of around 150 $\mu$m. Since giant particles of hafnium oxide tend to be deformed at a high temperature, they may degrade the high temperature characteristic of the sintered bodies. The degradation of the high temperature characteristic by giant particles of hafnium oxide can be suppressed by using at least one of structures (a) and (b) as follows;

(a) by dispersing a part of silicon carbide particles in hafnium oxide particles and (b) by coating the periphery of silicon carbide with hafnium oxide.

In the structure (a), a part of silicon carbide particles is dispersed in giant hafnium oxide particles which are formed by addition in large quantities. The silicon carbide particles prevent the giant hafnium oxide particles from being dislocated at a high temperature. In other words, the residual stress field formed at the periphery of the silicon carbide particles reinforces the hafnium oxide particles themselves. Thus, the high temperature characteristic of the sialon type sintered bodies can be prevented from being degraded. The disadvantage resulting from the giant hafnium oxide particles can be solved in the above mentioned manner. However, when the hafnium oxide particles become too large, the uniformity of the structure of the sintered bodies is degraded. Thus, the size of the hafnium oxide particles is preferably at most about 500 $\mu$m.

In the structure (b), the hafnium oxide particles are concentrated at the periphery of the silicon carbide particles in the sintering process so as to suppress the formation of an aggregate of the giant hafnium oxide particles. Thus, the high temperature characteristic of the sialon type sintered bodies can be prevented from being degraded. In addition, when the periphery of the silicon carbide particles is coated with hafnium oxide, the degradation of the sintering characteristic caused by silicon carbide can be further suppressed. Thus, it is possible to further add silicon carbide in large quantities. For example, it becomes possible to add around 40 parts by weight of silicon carbide to 100 parts by weight of the primary phase. The hafnium oxide present at the periphery of the silicon carbide particles may be in a film state or of an aggregate of particles. The thickness of the hafnium oxide is preferably 10 $\mu$m or less. When the thickness of the hafnium oxide exceeds 10 $\mu$m, the residual stress field formed at the periphery of the silicon carbide particles is absorbed by the hafnium oxide layer and thereby the adding effect of silicon carbide cannot be satisfactorily obtained.

The sialon type sintered bodies according to the present invention can be produced for example in the following manner.

First, around 2.5% to 20% by weight of $Al_2O_3$ powder are added to $Si_3N_4$ powder to prepare a starting material for the primary phase which almost satisfies the $\beta$ prime sialon composition. $Al_2O_3$ is solid solved in $Si_3N_4$ and thereby a sialon is formed. When the adding amount of $Al_2O_3$ exceeds 20% by weight, the strength of the sintered body degrades and thereby the amount of a secondary phase such as a grain boundary phase increases. In contrast, when the adding amount of $Al_2O_3$ is less than 2.5% by weight, it becomes difficult to obtain the sintered body with high density. The most suitable adding amount of $Al_2O_3$ is around 10% by weight.

The starting material for the primary phase which can be used is not limited to the above mentioned powder. Further, it is possible to use for example $Si_3N_4$ - $Al_2O_3$ - AlN type, $Si_3N_4$ - AlN - $SiO_2$ type, and commercially available synthesized $\beta$ prime sialon powder. However, when the $Si_3N_4$ - $Al_2O_3$ type is used, the effect of fineness of the crystalline particles and the like can be obtained. Thus, the mixed powder of the above mentioned two groups has a higher improvement effect of the characteristic than synthesized $\beta$ prime sialon powder and mixed powder satisfying the normal $\beta$ prime sialon composition. In addition, since the $\beta$ prime sialon phase is formed only with $Al_2O_3$, water can be used as a dispersing medium.

Thereafter, predetermined amounts of $HfO_2$ and SiC are added to the starting material for the primary phase and then adequately mixed to prepare material powder of a sintered body.

The starting material of $HfO_2$ is preferably fine powder with an average particle diameter of 2 $\mu$m or less. The starting material of $HfO_2$ is more preferably fine powder with an average particle diameter of 1 $\mu$m or less. By using such fine powder, the uniformly dispersing characteristic of $HfO_2$ is improved. To further improve the dispersing characteristic of $HfO_2$, as a starting material of $HfO_2$, an organic compound which contains hafnium and which is liquid at normal temperature can be effectively used. In the liquid organic compound containing hafnium, hafnium is uniformly present in the material powder. Thus, the effect of hafnium oxide can be effectively and uniformly accomplished. In addition, deviation among production lots can be remarkably decreased. Moreover, since hafnium oxide can be uniformly dispersed, the adding amount thereof can be decreased. Thus, the formation of an aggregate of giant particles of hafnium oxide can be suppressed.

Examples of the organic compounds which contain hafnium and are liquid at normal temperature are alkoxide hafnium such as tetramethoxide hafnium, tetraethoxide hafnium, and tetrabutoxyde hafnium. In the sintering process, such organic compounds become hafnium oxide. When an organic compound which contains hafnium and which is liquid at normal temperature is used, the adding amount of the organic compound should be determined by converting into that of hafnium oxide.

When an organic compound which contains hafnium and which is liquid at normal temperature is used as a starting material of hafnium oxide, an advantage can be obtained not only in the production process of sialon type sintered bodies, but also in that of silicon nitride type sintered bodies. For example, when silicon nitride group sintered bodies are produced, hafnium oxide is used as a sintering assistant agent. In this case, an organic compound which contains hafnium and which is liquid at normal temperature can be used as a starting material of hafnium oxide. An example of a material mixture of silicon nitride group sintering bodies is described in the following. Oxides of rare earth elements such as yttrium oxide, and aluminum nitride as sintering assistant agents are added and mixed with silicon nitride powder. 1 to 15 parts by weight of the sintering assistant agents are preferably added to 100 parts by weight of silicon nitride. Thereafter, the organic compound which contains hafnium and which is liquid at normal temperature is added to the resultant mixture to prepare a material mixture.

The starting material of SiC may be in either a particle state or a fiber state such as whisker. When the particle state SiC is used, if the size of the particles is large, a defect takes place and thereby occasionally degrading the mechanical strength of the sintered body. Thus, it is preferable to use SiC with an average particle diameter of 50 $\mu$m or less and with a maximum particle diameter of 100 $\mu$m or less.

Thereafter, the above mentioned material powder is molded into a desirable shape by a known molding method such as press molding method. Thereafter, the molded body is sintered in an inertia gas atmosphere of pressure-free at temperatures ranging from 1700° C. to 1900° C. Thereby, a sialon type sintered body according to the present invention can be obtained.

In addition, the above mentioned structure (a) can be obtained by satisfying the following conditions. First, the ratio between hafnium oxide and silicon carbide is properly determined. Then, the temperature rising speed is adjusted. After the sintering process, the materials are heated at a temperatures lower than the sintering temperature. Thereby, the silicon carbide particles can be dispersed in the hafnium oxide particles. By adjusting the temperature rising speed, the particle growing speed of hafnium oxide can be controlled. In the heating process after the sintering process, while the silicon carbide particles are dispersed, the hafnium oxide particles can be grown. The ratio of adding amounts between hafnium oxide and silicon carbide (ratio by weight) is preferably for example in the range from 2:1 to 1:2.

The above mentioned structure (b) can be obtained by using for example silicon carbide having a particular amount of oxide layer on the surface thereof. With this silicon carbide, a hafnium oxide layer can be readily formed at the periphery of silicon carbide. In this case, the amount of oxygen on the surface is preferably determined so that the amount of free $SiO_2$ is in the range from around 0.2% to around 2.0%. In addition, by properly setting the sintering temperature and the adding amount of hafnium oxide, the hafnium oxide layer can be readily formed at the periphery of the silicon carbide particles. The ratio of the adding amounts of hafnium oxide and silicon carbide (ratio by weight) is preferably for example in the range from 1:2 to 2:1.

The sialon type sintered bodies according to the present invention can be constructed with high density and have high fracture toughness value by pressure-free sintering method. However, it should be understood that the effects of the sialon type sintered bodies according to the present invention can be accomplished by using other sintering methods such as atmospheric pressure sintering method, hot press method, and hot static water pressure sintering method (HIP).

DESCRIPTION OF PREFERRED EMBODIMENTS

Figure 1:
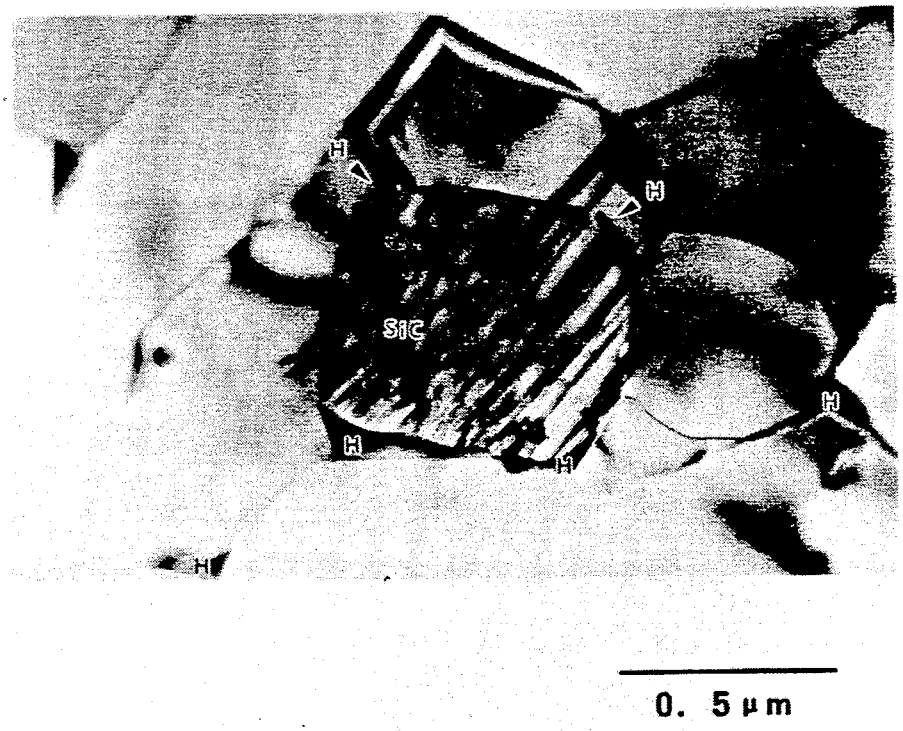
FIG. 1 is a photo taken by a transmission type electron microscope, the photo showing a structure of a sialon type sintered body produced in accordance with an embodiment of the present invention.

With reference to embodiments, the present invention will be described in more detail.

Embodiment 1

First, 2.5% by weight of $Al_2O_3$ powder with an average particle diameter of 0.9 μm were added and mixed with $Si_3N_4$ powder with an average particle diameter of 0.7 μm so as to prepare a starting material for a primary phase. Thereafter, 5 parts by weight of $HfO_2$ powder with an average particle diameter of 0.9 μm and 5 parts by weight of SiC powder with an average particle diameter of 0.5 μm were added to 100 parts by weight of the above material for the primary phase. These compounds were mixed by a ball mill with a dispersing medium of ethanol for 48 hours. Thereafter, the mixture was dried so as to prepare sintering material powder.

Thereafter, around 5 parts by weight of a binder were added to the 100 parts by weight of the above starting powder for a sintered body and then a plate shape molded body with dimensions of 50 mm long×50 mm wide×5 mm thick was produced at a molding pressure of 1000 kg/cm². After the plate shape molded body was degreased in a nitrogen gas atmosphere, the resultant molded body was sintered in a nitrogen gas atmosphere of the normal pressure at a temperature of 1850° C. for 2 hours. Thereby, a sintered body with the primary phase of a sialon was obtained.

In addition, in comparison with the sintered body according to the present invention, a sialon type sintered body (comparison 1) was produced in the same conditions as the embodiment 1 except that the adding amount of $HfO_2$ was 0.5 parts by weight (out of the scope of the present invention).

The sintered body density (relative density) and the fracture toughness value $K_{IC}$ for each sintered body thus produced were measured by micro indentation method. As the results, the sintered density of the sintered body according to the comparison 1 was as low as 88.0% and the fracture toughness value $K_{IC}$ thereof was also as low as 4.0 MPa m$^{\frac{1}{2}}$. In contrast, the sintered density of the sintered body according to the embodiment 1 was as high as 97.2% and the fracture toughness value $K_{IC}$ thereof was as high as 4.7 MPa m$^{\frac{1}{2}}$.

Thereafter, the sectional structure of the sintered body according to the embodiment 1 was observed by using a transmission type electron microscope. A photo taken by the transmission type electron microscope is shown in FIG. 1. In the figure, "H" represents $HfO_2$. Other than SiC are sialon crystalline particles. As shown in FIG. 1, $HfO_2$ (H) is present at the triple point by the sialon crystalline particles and at the interface between the sialon crystalline particles and the SiC particles.

Embodiments 2 to 12

$Si_3N_4$ power with an average particle diameter of 0.7 μm and $Al_2O_3$ powder with an average particle diameter of 0.9 μm were used with composition ratios shown in Table 1 so as to prepare starting materials for the primary phase. Thereafter, $HfO_2$ powder with an average particle diameter of 0.9 μm and SiC powder with an average particle diameter of 0.5 μm or SiC whisker with an aspect ratio of 1:20 were used to prepare material powder with composition ratios (parts by weight) shown in Table 1. Each material powder was used to produce a sialon type sintered body in the same condition as the embodiment 1.

In the comparison 2, material powder was produced without $HfO_2$ and then it was sintered by the hot press sintering method in a nitrogen gas atmosphere at a temperature of 1850° C. for 1 hour.

The sintered body density and the fracture toughness value $K_{IC}$ of each sialon type sintered body were measured in the same manner as the embodiment 1. The results are also shown in Table 1.

TABLE 1

| | Power for primary phase (mother phase) (% by weight) | | Added compound (parts by weight to 100 parts by weight of mother phase) | | | Sintered | |
|---|---|---|---|---|---|---|---|
| | $Si_3N_4$ | $Al_2O_3$ | $HfO_2$ | SiC (particles) | SiC (Whisker) | density (%) | $K_{IC}$ |
| Embodiments | | | | | | | |
| 1 | 97.5 | 2.5 | 5 | 5 | 0 | 97.2 | 4.7 |
| 2 | 95 | 5 | 10 | 10 | 0 | 98.9 | 4.9 |
| 3 | 90 | 10 | 5 | 5 | 0 | 99.0 | 4.8 |
| 4 | 90 | 10 | 20 | 15 | 0 | 98.7 | 5.9 |
| 5 | 90 | 10 | 60 | 30 | 0 | 96.7 | 6.8 |
| 6 | 85 | 15 | 20 | 25 | 0 | 97.4 | 6.2 |
| 7 | 80 | 20 | 40 | 30 | 0 | 98.0 | 6.7 |
| 8 | 85 | 15 | 10 | 10 | 0 | 98.2 | 5.9 |
| 9 | 97.5 | 2.5 | 5 | 0 | 5 | 97.2 | 4.9 |
| 10 | 90 | 10 | 40 | 0 | 25 | 96.2 | 7.1 |
| 11 | 90 | 10 | 15 | 0 | 10 | 98.1 | 5.3 |
| 12 | 80 | 20 | 60 | 0 | 30 | 98.0 | 6.9 |
| Comparison 1 | 95 | 5 | 0.5 | 5 | 0 | 88.0 | 4.0 |
| Comparison 2 | 95 | 5 | 0 | 10 | 0 | 95.0 | 4.3 |

*Only in the comparison 2, the hot press method was used.

As shown in Table 1, when both $HfO_2$ and SiC were used, the sintered body according to each embodiment had high density. In addition, when a large amount of SiC was added, the sintered body had high density. Accordingly, the fracture toughness value $K_{IC}$ was clearly improved.

Further, as a comparison 3, the sialon type sintered body was produced in the same manner as the embodiments except that $Y_2O_3$ powder was used instead of $HfO_2$ powder. This sialon type sintered body has the almost same sintered body density and the fracture toughness value $K_{IC}$ as those of the embodiments. However, the high temperature strength (at 1300° C.) was remarkably reduced to be 400 MPa. The high temperature strength of the sialon type sintered body of the each embodiment was about 700 MPa.

Embodiment 13

First, 10% by weight of $Al_2O_3$ powder were added and mixed with $Si_3N_4$ powder with an average particle diameter of 0.7 μm. Thereafter, 100 parts by weight of a solution of Hf $(OC_3H_7)_4$ which were equivalent to those of $HfO_2$ (the amount of a solution of Hf $(OC_3H_7)_4$ means 10 parts by weight of $HfO_2$ when Hf $(OC_3H_7)_4$ is converted to $HfO_2$) and 15 parts by weight of SiC powder with an average particle diameter of 0.5 μm were added to 100 parts by weight of the above mentioned mixture. They were mixed with a dispersing medium of ethanol for 24 hours. Thereafter, the resultant mixture was dried thereby to produce material powder.

After around 5 parts by weight of a binder were added to the 100 parts by weight of the above mentioned material powder, a plate shape molded body with dimensions of 50 mm long×50 mm wide×5 mm thick was produced at a molding pressure of 1 ton/cm². Thereafter, the molded body was degreased in a nitrogen gas atmosphere and then sintered in a nitrogen gas atmosphere of normal pressure at a temperature of 1850° C. for 2 hours. Thereby, a sintered body with the primary phase of a sialon was obtained. Thereafter, in the same conditions, 100 pieces of the sintered bodies were produced.

In addition, as a reference example, 100 pieces of sialon type sintered bodies were produced in the same conditions as the embodiment 13 except that hafnium oxide powder was used instead of alkoxide hafnium.

The relative density, the high temperature strength by a three-point bending test, and the fracture toughness value $K_{IC}$ were measured for each sintered body produced in the above manner. The results are shown Table 2.

TABLE 2

|  | Embodiment 13 | Reference 1 |
|---|---|---|
| Average sintered body density (%) | 98.5 | 98.3 |
| Maximum and minimum values of sintered body density | 3.29 to 3.34 | 3.25 to 3.33 |
| Average strength of high temperature three-point bending test at 1300° C. (MPa) | 680 | 660 |
| Maximum and minimum values of high temperature strength | 660 to 720 | 600 to 700 |
| Average fracture toughness value $K_{IC}$ (MPa m$^{\frac{1}{2}}$) | 5.7 | 5.6 |
| Maximum and minimum values of fracture toughness | 5.3 to 5.9 | 5.0 to 5.9 |

As shown in Table 2, when hafnium alkoxide as a starting material of hafnium oxide is used, each characteristic can be further improved with small deviation thereof.

Embodiment 14

First, $Si_3N_4$ powder with an average particle diameter of 0.7 μm, $Al_2O_3$ powder with an average particle diameter of 0.9 μm, and AlN powder with an average particle diameter of 0.6 μm were prepared. These compounds were mixed so as to satisfy the composition of $Si_5 Al_1 O_1 N_7$ ($z=1$) and powder for the primary phase was prepared. Thereafter, 10 parts by weight of $HfO_2$ powder with an average particle diameter of 1.6 μm and 10 parts by weight of SiC whisker with an average shorter diameter of 2 μm and with an aspect ratio of 1:20 (with a surface oxide concentration of 0.8%) were added to 100 parts by weight of the above mentioned powder for the primary phase. These compounds were mixed by a ball mill with a dispersing medium of ethanol for 48 hours. Thereafter, the mixture was dried so as to prepare material powder for sintered body.

Thereafter, around 5 parts by weight of a binder were added to 100 parts by weight of the above mentioned material powder for sintered body. Thereafter, a plate shape molded body with dimensions of 50 mm long×50 mm wide×5 mm thick was produced at a molding pressure of 1000 kg/cm². Thereafter, the molded body was degreased in a nitrogen gas atmosphere and then sintered in a nitrogen gas atmosphere of 5 kg/cm² at a temperature of 1850° C. for 4 hours. Thereby, a sintered body with the primary phase of a sialon was produced.

The structure of the sialon type sintered body obtained in the above manner was observed by the transmission type electron microscope. As the result, it was found that a $HfO_2$ layer with a thickness of around 0.01 μm was formed at the periphery of SiC whisker which was present in the primary phase (sialon phase). In addition, although the $HfO_2$ particles were dispersed to other than the periphery of SiC whisker, the diameter thereof was as small as around 3 μm.

In addition, the sintered body density, the three-point bending strength at 1300° C., and the fracture toughness value $K_{IC}$ by the micro indentation method were measured for the above mentioned sintered body. As the results, good values where the relative density was 98.3%, the three-point bending strength at 1300° C. was 82 kgf/mm², and the fracture toughness value $K_{IC}$ was 6.9 MPa m$^{\frac{1}{2}}$ were obtained.

Reference 2

A sintered body with the primary phase of a sialon was produced in the same conditions as the embodiment 1 except that 70 parts by weight of $HfO_2$ powder and 40 parts by weight of SiC whisker were added to the powder for the primary phase produced in the embodiment 14, the $HfO_2$ powder and the SiC whisker being the same as those used in the embodiment 14.

Thereafter, the structure of the sialon type sintered body being produced in the above manner was observed by using a scanning type electron microscope. As the results, although a $HfO_2$ layer was formed at the periphery of SiC whisker, the thickness thereof was as much as 12.3 μm. In addition, the relative density of the above mentioned sintered body, the three-point bending strength at 1300° C. thereof, and the fracture toughness value $K_{IC}$ thereof were 85.1%, 41 kgf mm², and 4.2 MPa m$^{\frac{1}{2}}$, respectively.

Embodiment 15

10 parts by weight of $HfO_2$ powder with an average particle diameter of 1.6 μm and 15 parts by weight of SiC powder with an average particle diameter of 0.5 μm were added to 100 parts by weight of the powder for the primary phase produced in the embodiment 14. Thereafter, these compounds were mixed with a dispersing medium of ethanol by a ball mill for 48 hours. Thereafter, the mixture was dried to prepare material powder for sintered body.

Thereafter, around 5 parts by weight of a binder were added to 100 parts by weight of the above mentioned material powder for sintered body and then a plate shape molded body with dimensions of 50 mm long×50 mm wide×5 mm thick was produced at a molding pressure of around 1000 kg/cm². Thereafter, the molded body was degreased in a nitrogen gas atmosphere. Thereafter, the resultant molded body was heated in a nitrogen gas atmosphere of 5 kg/cm² at a temperature rising speed of 15° C./min until the temperature became 1850° C., held at this temperature for 2 hours, and then heated at a temperature of 1825° C. for 20 hours. Thereby, a sintered body with the primary phase of a sialon was produced.

The structure of the sialon type sintered body produced in the above mentioned manner was observed by using the transmission type electron microscope. As the results, it was found that $HfO_2$ particles were precipitated in such a manner that they were mixed into crystalline particles of the sialon. Although the diameter of the $HfO_2$ particles was as large as around 50 μm, SiC particles were distributed therein. In addition, at the grain boundary of the sialon crystalline particles, the SiC particles were distributed. The average diameter of the SiC particles was around 1.5 μm.

In addition, the relative density of the above mentioned sintered body, the three-point bending strength at 1300° C. thereof, and the fracture toughness value $K_{IC}$ thereof were 98.3%, 79 kgf/mm², and 6.7 MPa m$^{\frac{1}{2}}$, respectively.

Embodiment 16

First, 10% by weight of $Al_2O_3$ powder were added and mixed with $Si_3N_4$ powder with an average particle diameter of 0.7 μm. Thereafter, 4 parts by weight of a solution of Hf $(OC_3H_7)_4$ were added to 100 parts by weight of the above mentioned mixture and then mixed with a dispersing medium of ethanol for 48 hours. Thereafter, the resultant mixture was dried and then material mixture powder was obtained.

Thereafter, around 5 parts by weight of a binder were added to 100 parts by weight of the above mentioned material mixture powder so that the resultant mixture was granulated. Thereafter, a plate shape molded body with dimensions of 50 mm long × 50 mm wide × 5 mm thick was produced at a molding pressure of 1 ton/cm². Thereafter, the resultant molded body was degreased in a nitrogen gas atmosphere and then sintered in a nitrogen gas atmosphere of 5 kg/cm² at a temperature of 1850° C. for 2 hours. Thereby, a sintered body with the primary phase of a sialon was produced. 100 pieces of the sintered bodies were produced in the same conditions.

In addition, as the comparison 4, 100 pieces of sialon type sintered bodies were produced in the same conditions as the embodiment 16 except that hafnium oxide powder was used instead of alkoxide hafnium.

The relative density of each sialon type sintered body produced in the above mentioned manner, the high temperature strength by the three-point bending strength test thereof, and the fracture toughness value $K_{IC}$ thereof were measured. The results are shown in Table 3.

TABLE 3

| | Embodiment 16 | Comparison 4 |
|---|---|---|
| Average sintered body density (%) | 99.8 | 99.3 |
| Maximum and minimum values of sintered body density | 3.23 to 3.239 | 3.205 to 3.235 |
| Average strength of high temperature three-point bending test at 1300° C. (MPa) | 880 | 810 |
| Maximum and minimum values of high temperature strength | 850 to 900 | 720 to 890 |
| Average rupture toughness value $K_{IC}$ (MPa m$^{\frac{1}{2}}$) | 4.2 | 4.2 |
| Maximum and minimum values of rupture toughness | 4.0 to 4.6 | 3.9 to 4.7 |

As shown in Table 3, when alkoxide hafnium was used as a starting material of hafnium oxide, each characteristic could be improved with very small deviation thereof.

Embodiment 17

First, 5 parts by weight of $Y_2O_3$ powder, 5 parts by weight of AlN powder, and 2 parts by weight of Hf $(OC_3H_7)_4$ were added and mixed with 100 parts by weight of $Si_3N_4$ with an average particle diameter of 0.7 μm. These compounds were mixed with a dispersing medium of ethanol for 24 hours and then dried to prepare material mixture powder.

Thereafter, 5 parts by weight of a binder were added to 100 parts by weight of the above mentioned material mixture powder so that the resultant mixture was granulated. Thereafter, a plate shape molded body with dimensions of 50 mm long × 50 mm wide × 5 mm thick was produced at a molding pressure of 1 ton/cm². Thereafter, the resultant molded body was degreased in a nitrogen gas atmosphere and then sintered in a nitrogen gas atmosphere of 5kg/cm² at a temperature of 1850° C. for 2 hours. Thereby, a ceramic sintered body with the primary phase of silicon nitride was produced. 100 pieces of the sintered bodies were produced in the same conditions.

In addition, as the comparison 5, 100 pieces of silicon nitride sintered bodies were produced in the same conditions as the embodiment 17 except that hafnium oxide powder was used instead of alkoxide hafnium.

The sintered body density of each silicon nitride group sintered body produced in the above manner, the high temperature strength by the three-point bending strength test thereof, and the fracture toughness value $K_{IC}$ thereof were measured. The results are shown in Table 4.

TABLE 4

| | Embodiment 17 | Comparison 5 |
|---|---|---|
| Average sintered density (%) | 99.9 | 99.7 |
| Maximum and minimum values of sintered density | 3.278 to 3.282 | 3.260 to 3.281 |
| Average strength of high temperature three-point bending test at 1300° C. (MPa) | 830 | 790 |
| Maximum and minimum values of high temperature strength | 810 to 850 | 690 to 820 |
| Average rupture toughness value $K_{IC}$ (MPa m$^{\frac{1}{2}}$) | 7.3 | 7.3 |
| Maximum and minimum values of rupture toughness | 7.0 to 7.6 | 6.9 to 7.7 |

As was described in above embodiments, in the sintered bodies with the primary phase of sialon according to the present invention, by adding hafnium oxide, even if an adding amount of silicon carbide is increased, the sintered bodies can be constructed with high density by pressure-free sintering. Moreover, in comparison with a sintered body constructed with high density by hot press process without adding hafnium oxide, the sintered bodies according to the present invention have high fracture toughness value. Thereby, sialon type sintered bodies with high fracture toughness value and high reliability can be produced by pressure-free sintering process suitable for mass production.

What is claimed is:

1. A sialon-based sintered body, comprising:
   a primary phase consisting essentially of at least one sialon selected from the group consisting of β-sialon and α-sialon; and
   a dispersion phase dispersed in said primary phase, said dispersion phase having 1 to 6 parts by weight of hafnium oxide and 5 to 30 parts by weight of silicon carbide for 100 parts by weight of said primary phase.

2. The sailon-based sintered body as set forth in claim 1, wherein said silicon carbide is present independently as a particle state in said primary phase.

3. The sailon-based sintered body as set forth in claim 2, wherein said silicon carbide is present independently as particles with an average particle diameter of 50 $\mu$m or less in said primary phase.

4. The sailon-based sintered body as set forth in claim 1, wherein said silicon carbide is present independently as whisker with an average shorter diameter ranging from 0.2 $\mu$m to 80 $\mu$m and with an aspect ratio ranging from 1:3 to 1:20 in said primary phase.

5. The sailon type sintered body as set forth in claim 2, wherein said hafnium oxide is present at the grain boundary of crystalline particles constituting said primary phase and at the interface between the particles of said silicon carbide and the crystalline particles constituting said primary phase.

6. The sailon-based sintered body as set forth in claim 1, wherein the periphery of said silicon carbide is covered with said hafnium oxide.

7. The sailon-based sintered body as set forth in claim 1, wherein a part of said silicon carbide are contained in the crystalline particles of said hafnium oxide.

8. The sailon-based sintered body as set forth in claim 1, wherein said primary phase is $\beta$-sialon.

9. The sailon-based sintered body as set forth in claim 1, wherein said primary phase is $\alpha$-sialon.

10. The sailon-based sintered body, wherein a mixture of 1 to 60 parts by weight of hafnium oxide, 5 to 30 parts by weight of silicon carbide, and 100 parts by weight of silicon nitride containing 2.5% to 20% by weight of aluminum oxide is molded and sintered.

11. A method of producing sialon-based sintered bodies comprising the steps of:

mixing 1 to 60 parts by weight of a hafnium compound calculated in terms of hafnium oxide, 5 to 30 parts by weight of silicon carbide powder, and 100 parts by weight of silicon nitride powder containing 2.5 to 20% by weight of aluminum oxide powder;

molding said mixture into a desired shape; and sintering the resultant molded body in a pressure-free atmosphere.

12. The method of producing sialon-based sintered bodies as set forth in claim 11, wherein said hafnium compound is an organic compound which is liquid at normal temperature.

13. The method of producing sialon-based sintered bodies as set forth in claim 12, wherein said organic compound is hafnium alkoxide.

14. The method of producing sialon-based sintered bodies comprising the steps of:

adding and mixing an organic compound which contains at least hafnium and which is liquid at normal temperature with a primary phase material consisting essentially of at least one sialon selected from the group consisting of $\beta$-sialon and $\alpha$-sialon to prepare material powder;

molding said material powder into a desired shape; and sintering the resultant molded body.

15. A method of producing silicon nitride-based sintered bodies, comprising the steps of:

adding and mixing an organic compound which contains hafnium and which is liquid at normal temperature, oxide powder of a rare earth element, and aluminum nitride powder with silicon nitride powder to prepare material powder;

molding said material powder into a desired shape; and sintering the resultant molded body.

16. A method of producing sialon-based sintered bodies as claimed in claim 14, wherein said step of sintering is a sintering in a pressure-free atmosphere.

17. A method of producing sialon-based sintered bodies as claimed in claim 15, wherein said step of sintering is a sintering in a pressure-free atmosphere.

* * * * *

UNITED STATES PATENT AND TRADEMARK OFFICE
CERTIFICATE OF CORRECTION

PATENT NO. : 5,238,885
DATED : August 24, 1993
INVENTOR(S) : Asayama, et. al.

It is certified that error appears in the above-indentified patent and that said Letters Patent is hereby corrected as shown below:

Column 1, line 15, "sailon type" should read --sialon-based--;
Column 2, line 30, "20" should read --20%--.
Column 4, line 67, "$_2O_3$is" should read --$_2O_3$ is--.

Column 13, line 3, "sailon-based" should read --sialon-based--;
line 6, "sailon-based" should read --sialon-based--;
line 10, "sailon-based" should read --sialon-based--;
Column 13, line 15, "sailon type" should read --sialon-based--;
line 21, "sailon-based" should read --sialon-based--;
line 24, "sailon-based" should read --sialon-based--;
line 27, "sailon-based" should read --sialon-based--;
line 29, "sailon-based" should read --sialon-based--;
line 31, "sailon-based" should read --sialon-based--;
line 40, "powder ," should read --Powder, --.

Signed and Sealed this

Thirtieth Day of August, 1994

Attest:

BRUCE LEHMAN

Attesting Officer      *Commissioner of Patents and Trademarks*